United States Patent

Wentz et al.

[11] 3,871,511
[45] Mar. 18, 1975

[54] SORTER SYSTEM INDUCTION MEANS

[75] Inventors: Edward A. Wentz, Gaithersburg; David M. Shinnick, Frederick, both of Md.

[73] Assignee: American Chain & Cable Company, Inc., Bridgeport, Conn.

[22] Filed: Feb. 9, 1973

[21] Appl. No.: 331,205

[52] U.S. Cl. .................. 198/103, 198/37, 198/211
[51] Int. Cl. .......................................... B65g 37/00
[58] Field of Search ............... 198/25, 103, 211, 37

[56] References Cited
UNITED STATES PATENTS

| 1,503,521 | 8/1924 | Strandt | 198/25 |
| 2,106,469 | 1/1938 | Seil | 198/25 |
| 2,176,761 | 10/1939 | Fisher et al. | 198/103 |
| 3,279,625 | 10/1966 | McConnell et al. | 198/25 |
| 3,282,444 | 11/1966 | McConnell | 198/25 |
| 3,346,094 | 10/1967 | Vamvakas | 198/25 |

Primary Examiner—Evon C. Blunk
Assistant Examiner—Richard K. Thomson
Attorney, Agent, or Firm—Barnes, Kisselle, Raisch & Choate

[57] ABSTRACT

Articles such as axially elongated carpet rolls are transferred from the delivery end of an input conveyor to a sorter conveyor for delivery to preselected destinations by a pair of rotor assemblies that are rotationally indexed between predetermined positions in sequential overlapping relation to each other. Rotation of the rotor assemblies are synchronized with operational conditions of the input and sorter conveyors.

10 Claims, 8 Drawing Figures

SORTER SYSTEM INDUCTION MEANS

This invention relates to the transfer or induction of hard to handle articles to a sorter conveyor.

In connection with automated materials handling systems and equipment for warehouses, distribution centers, truck and airline terminals and other industrial installations, troublesome problems arise with respect to relatively large and/or bulky articles such as carpeting, linoleum, fencing, roofing materials, mail sacks etc. One particular source of trouble in such material handling systems occurs adjacent the receiving zone on the sorter conveyor through which coded articles are delivered to preselected destinations. At this location in the system, the motion of the articles must be variably controlled in accordance with various conditions both upstream and downstream along the path of travel as well as to accomodate time for entry of destination code data into a memory by personnel to control the sorter conveyor system. For proper transfer of the articles to the sorter conveyor, the massiveness of the articles, the wide variation in sizes thereof must also be dealt with. For example, in handling carpet rolls, the rolls will vary from 4 to 24 inches in diameter, from 27 inches to 15 feet in length, and weigh up to 320 pounds. Such carpet rolls are also more flexible and softer than rigid items usually handled and create special problems.

It is therefore an important object of the present invention to provide apparatus for transferring hard to handle articles from the delivery end of a belt conveyor to a receiving zone on a sorter tray type conveyor in an automated materials handling system through which the articles are delivered to preselected destinations with sufficient pause in the travel of the articles to enable personnel to read coded information on the articles and enter the same into a memory. The foregoing objective is achieved with a maximum flow rate of articles and with minimum malfunction of the system by correlation of the transfer operation with upstream and downstream conditions along the path of travel.

In accordance with the present invention, the article transferring apparatus includes one or more rotor assemblies which sequentially transports the articles to the sorter conveyor. Although adjacent rotors with article holding pockets for sequential transfer of articles are well known, they are generally operated continuously in a cyclically synchronized relationship. Contrary thereto, the rotor assemblies are controlled for intermittent operation in accordance with upstream and downstream conditions detected by photo-sensors, limit switches and malfunction sensing switches. The rotor assemblies are provided with vanes to interrupt gravitationally induced movement of the articles to sequentially effect pauses in the travel of the articles, with an overlap in rotation of the rotors between indexed positions to obtain maximum flow density. The vanes on the rotors are axially elongated to accomodate articles of maximum length in a direction transverse to the direction of travel. Also, the vanes on at least one of the rotors adjacent the delivery end of the input conveyor, form entrance and exit ramps in the indexed positions of the rotor to guide downward movement of the articles under gravitational inducement, movement being augmented by the vanes acting as paddles during rotation of the rotor between the indexed positions. Releasable disc brakes at opposite axial ends of the rotors hold the rotors against rotation in the indexed positions to absorb the impact of the massive articles against the vanes or paddles.

In one illustrated embodiment of the invention, a second rotor assembly adjacent the receiving zone of the sorter conveyor is provided with vanes that act as gates to obstruct movement of the articles. These gates are rotated in a direction opposite to that of the aforementioned paddle vanes and at a faster speed to release the articles for prompt movement onto the sorter conveyor after the article is advanced from the paddle rotor. The foregoing arrangement is particularly suited for handling long cylindrical items. It is, however, contemplated that the rotor adjacent the sorter conveyor may be provided with paddles instead of gates and rotated in the same direction as the preceding rotor to handle articles such as mail bags that require additional inducement for movement onto the sorter conveyor.

The arrangement of a photo-sensing relay detecting articles on the entrance ramp vane of the rotor adjacent the input conveyor to initiate a sequential, overlapping rotational cycle of the rotors, renders the apparatus suitable for use with either a continuously operating or an intermittently operating input conveyor. Cam operated switches and additional photo sensors actuated in response to rotation of the rotors provide input data for the sorter conveyor control system, produce the overlap in rotational movement of the rotors and correlate operation of the transfer apparatus with operating conditions of the input and sorter conveyors.

Figure 1:
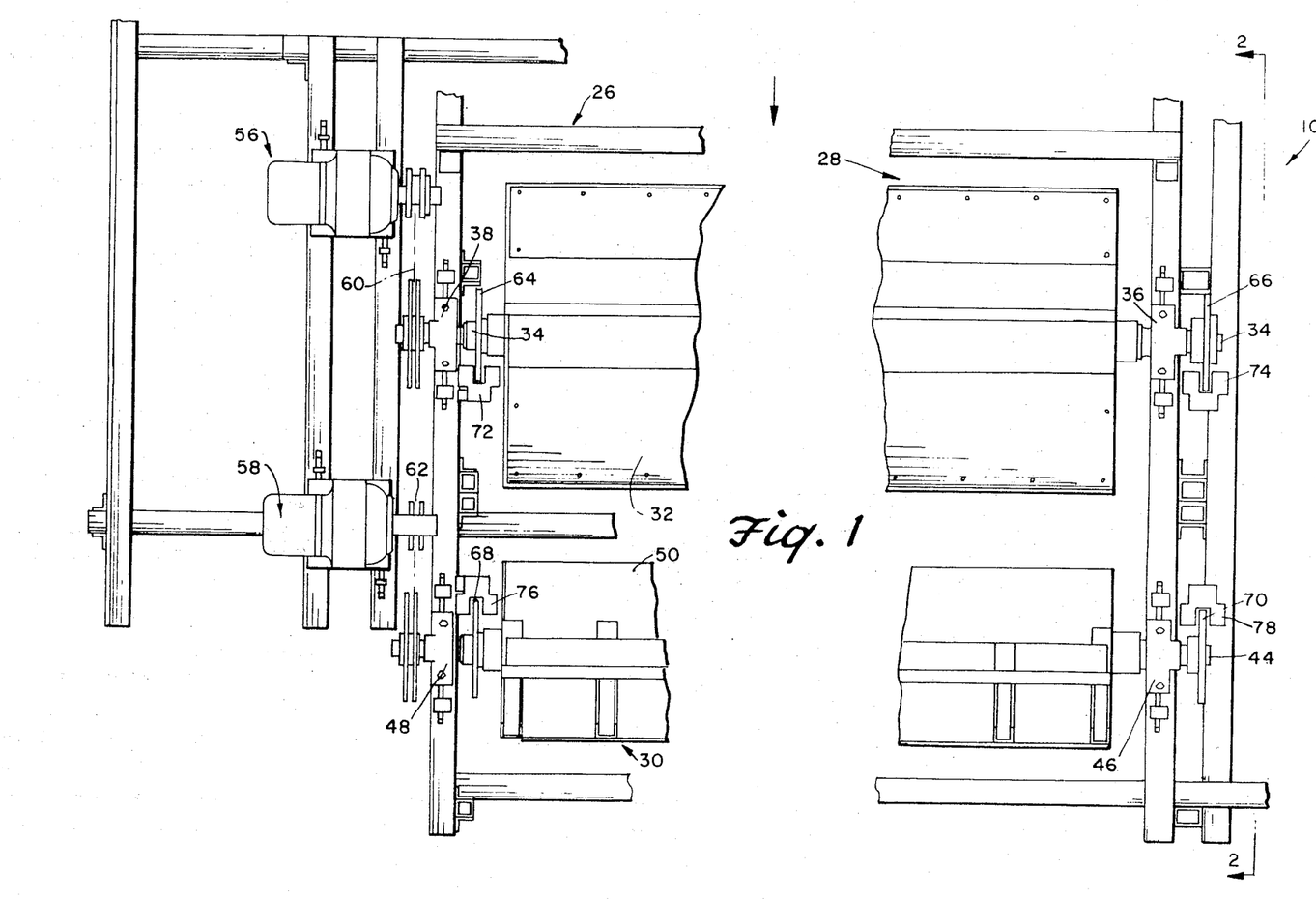
FIG. 1 is a partial top plan view of the apparatus constructed in accordance with the present invention.
Figures 2, 7:
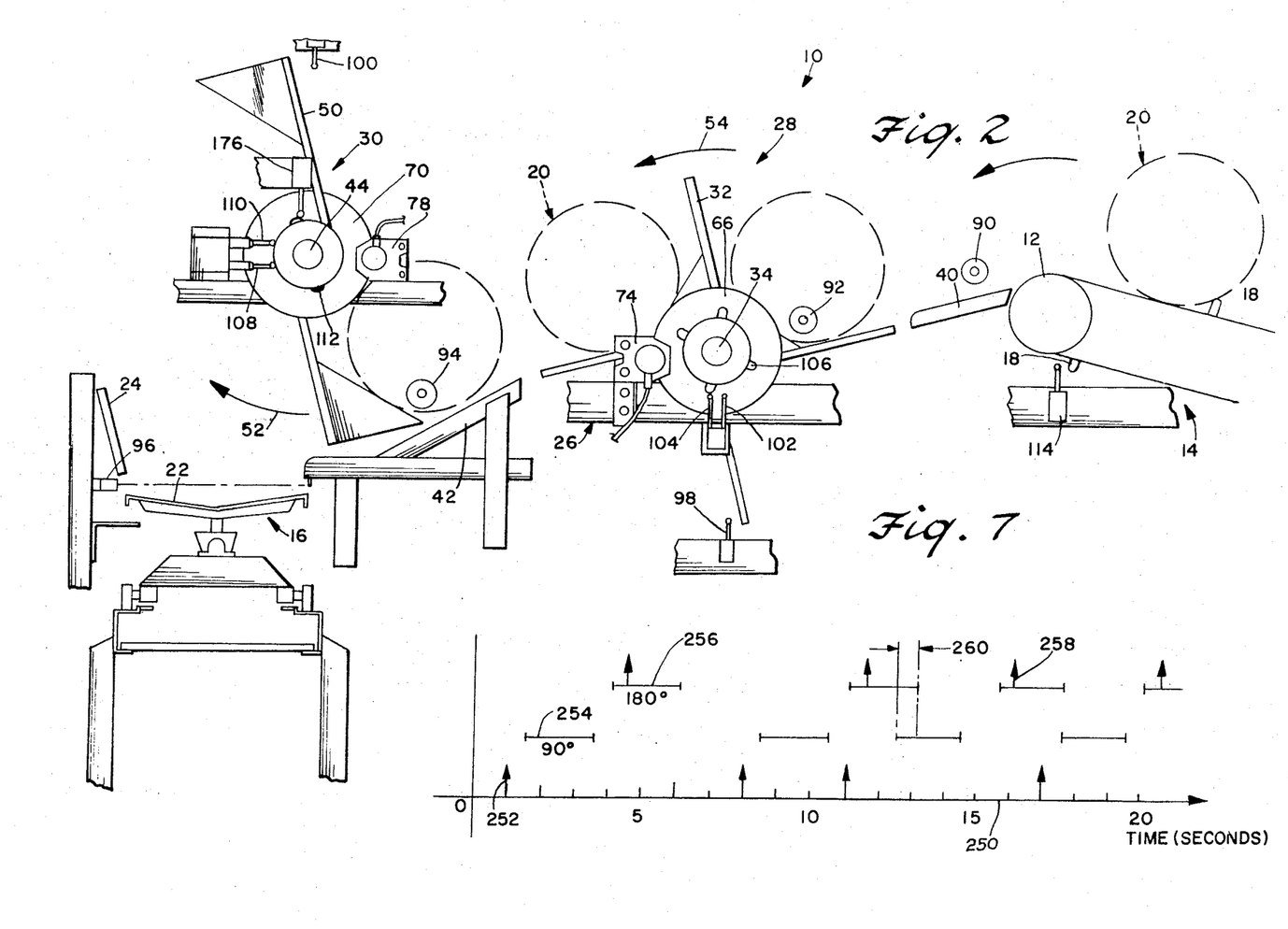
FIG. 2 is a partial side elevation of the apparatus taken substantially through a plane indicated by section line 2—2 in FIG. 1.
FIG. 7 is a graphical illustration of an operational feature of the invention.

Referring now to the drawings in detail, FIGS. 1 and 2 illustrate the article transfer apparatus of the present invention generally referred to by reference numeral 10. The apparatus 10 is located between the delivery end 12 of a typical input conveyor 14 and the receiving zone of a sorter conveyor 16. The input conveyor is of the endless belt type provided with belt mounted flights 18 for movement of articles 20 at an upward incline toward the delivery end 12 from which the articles are dropped onto the transfer apparatus 10. The articles are discharged from the transfer apparatus onto a plurality of trays 22 of the sorter conveyor. A preselected number of trays 22, such as five, to accomodate the maximum length of articles being handled, are operatively interconnected for receiving articles at the receiving zone along which the backstop 24 is located in order to deliver the articles to preselected destinations at which the interconnected trays are laterally tilted to unload the article in a manner well known to those skilled in the art. As shown in FIG. 2, the articles are conveyed by the sorter conveyor from the receiving zone in a direction perpendicular to the direction of travel of the articles from the input conveyor 14 through the transfer apparatus 10.

With continued reference to FIGS. 1 and 2, the transfer apparatus includes a frame assembly generally referred to by reference numeral 26 positioned between the conveyors 14 and 16 for rotatably supporting a pair of rotor assemblies generally referred to by reference numerals 28 and 30. The rotor assemblies are axially elongated to accomodate the maximum length of articles 20 to be handled such as carpet rolls. The rotor assembly 28 located adjacent the delivery end 12 of the input conveyor 14 is provided with vanes 32 that extend substantially the entire axial length of the rotor shaft 34 to which the vanes are connected. In the illustrated embodiment, there are four equiangularly spaced vanes 32. Also as shown in FIG. 2, the vanes 32 extend generally in radial relation to the rotational axis of the rotor shaft 34 which is rotatably mounted by bearing assemblies 36 and 38 fixed to the frame assembly adjacent opposite axial ends of the shaft. The rotor assembly 28 is adapted to be rotationally indexed between predetermined angular positions so that a pair of diametrically opposite vanes 32 will form or act as downwardly inclined ramps to rollingly guide movement of the carpet rolls or articles 20 by gravitational inducement. The vane extending from the rotor assembly toward the delivery end of the conveyor forms an entrance ramp that may be bridged with the delivery end by a fixed ramp 40 as shown in FIG. 2. The opposite vane forms an exit ramp to rollingly guide movement of an article onto a fixed ramp 42 underlying the rotor assembly 30.

In the illustrated embodiment, the rotor assembly 30 includes a rotor shaft 44 rotatably mounted by a pair of bearing assemblies 46 and 48 adjacent opposite axial ends thereof. The rotational axis of the rotor shaft 44 is vertically spaced above that of the rotor shaft 34 so that a pair of vanes 50 may extend therefrom into close spaced relation to the fixed ramp 42 in each of the predetermined angular positions between which the rotor assembly 30 is indexed. Two vanes 50 are associated with the rotor assembly 30 and extend generally in radial relation to the rotational axis of the rotor shaft 44 as shown in FIG. 2. The rotor assembly 30 is indexed 180° for each 90° of angular movement of the rotor assembly 28 and is accordingly rotated at a faster speed. The vanes 50 of the rotor assembly 30 act as gates to obstruct or interrupt movement of articles along the fixed ramp 42. The gate vanes 50 are rotated in a clockwise direction as indicated by arrow 52 in FIG. 2 for release of the articles whereas the rotor assembly 28 is rotatably indexed in a counter-clockwise direction as indicated by arrow 54 in order to vertically displace and centrifugally augment the gravitational induced movement of the articles from the input conveyor to the fixed ramp 42, the vanes acting as paddles during such indexing movement.

Figure 3:
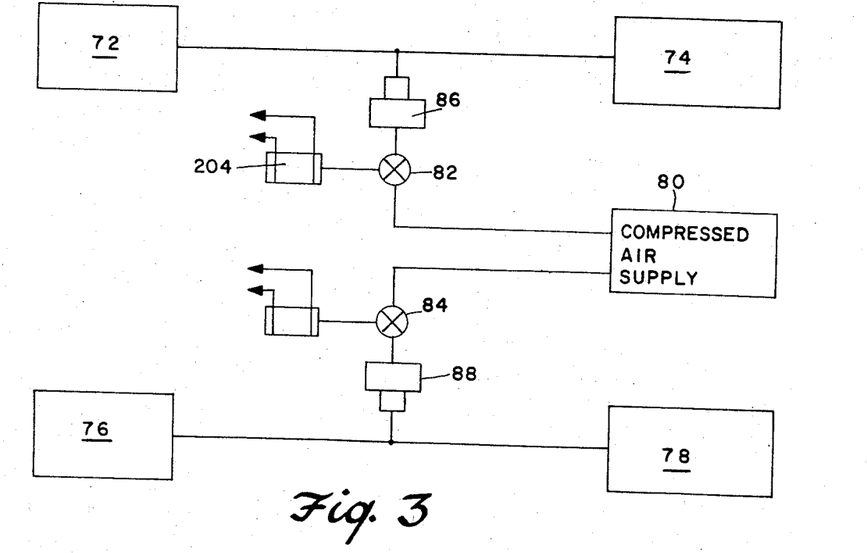
FIG. 3 is a schematic diagram of the fluid brake release system associated with the invention.

As more clearly seen in FIG. 1, the rotor assemblies 28 and 30 are respectively rotationally indexed by brake motor assemblies 56 and 58 that are drivingly connected to the respective rotor assemblies by sprocket gearing 60 and 62 at one axial end of each rotor assembly. There are also four brake discs 64, 66, 68 and 70 connected to the rotor shafts 34 and 44 adjacent opposite axial ends. Each brake disc is normally engaged by a releasable brake mechanism 72, 74, 76 and 78. Brake assemblies are provided for both axial ends of each rotor assembly to not only firmly hold the rotor assembly in each of its indexed positions but also to avoid twist of the rotor assembly in view of the large impact forces exerted thereon by the relatively massive articles being handled. Both brake devices for each rotor assembly are released simultaneously with the energization of the associated brake motor 56 and 58 by means of a fluid pressure control system diagrammatically shown in FIG. 3. Fluid such as compressed air, is supplied from a suitable source 80 to each pressure intensifier 86 and 88 from which fluid pressure is applied to a pair of brake devices. A pair of solenoid controlled valves 82 and 84 respectively connected to an associated pressure intensifier 86 or 88, control the engagement and disengagement of the brake devices.

FIG. 2 also illustrates the relative locations of the basic control components associated with the transfer apparatus 10. These control components include photo-sensing relay devices of the retro-reflective type for detecting the presence or absence of articles during travel from the delivery end of the input conveyor to the receiving zone on the sorter conveyor. The photo-sensing devices include an input sensor 90 located adjacent the delivery end of the input conveyor closely spaced above the fixed ramp 40 and a sensor 92 establishing a fixed sensing beam parallel to that of sensor 90 and extending parallel to the rotational axis of rotor shaft 34 closely spaced above the entrance ramp in the indexed position of the rotor assembly. Also, a sensor 94 is closely spaced above the fixed ramp 42 ahead of the gate vane 50 while a sensor 96 is located at the receiving zone to establish a sensing beam across the sorter trays perpendicular to the sensing beams associated with the other sensors 90, 92, and 94. The sensor 90 is operative to signal reception of an article in the transfer assembly while the sensor 96 will prevent operation of the rotor assembly 30 until a previously delivered article has cleared the receiving zone on the sorter conveyor. The rotor assembly 30 is conditioned for rotation when a roll is detected by sensor 94, on the rotor assembly 30. The rotor assembly 28, on the other hand, is conditioned for rotation after an article is detected by sensor 92.

Intermittent movement of the rotor assemblies are respectively controlled by actuation of limit switches 98 and 100 fixedly mounted on the frame for engagement by the rotor vanes 32 and 50 respectively. Thus, the limit switches 98 and 100 are operative through the drive motors 56 and 58 to rotationally index the rotor assemblies by 90° and 180° by limiting rotational movement. A pair of limit switches 102 and 104 are fixedly mounted adjacent the brake disc 66 of rotor assembly 28 for engagement by four cam lobes 106 on the brake disc in order to respectively supply an output signal to a memory system for controlling automated operation of the sorter conveyor and to correlate operation of the transfer apparatus with conditions both upstream and downstream thereof. In conjunction with the referred to functions of limit switches 102 and 104, another pair of limit switches 108 and 110 are fixedly mounted adjacent the brake disc 70 of rotor assembly 30 for enagement by a pair of cam lobes 112 mounted on the brake disc 70. A reset switch 114 is fixedly mounted by the frame below the lower flight of the input conveyor adjacent the delivery end of the input conveyor for engagement by the flights 18 in order to control recycling of a control system associated with the transfer apparatus 10.

Figure 4:
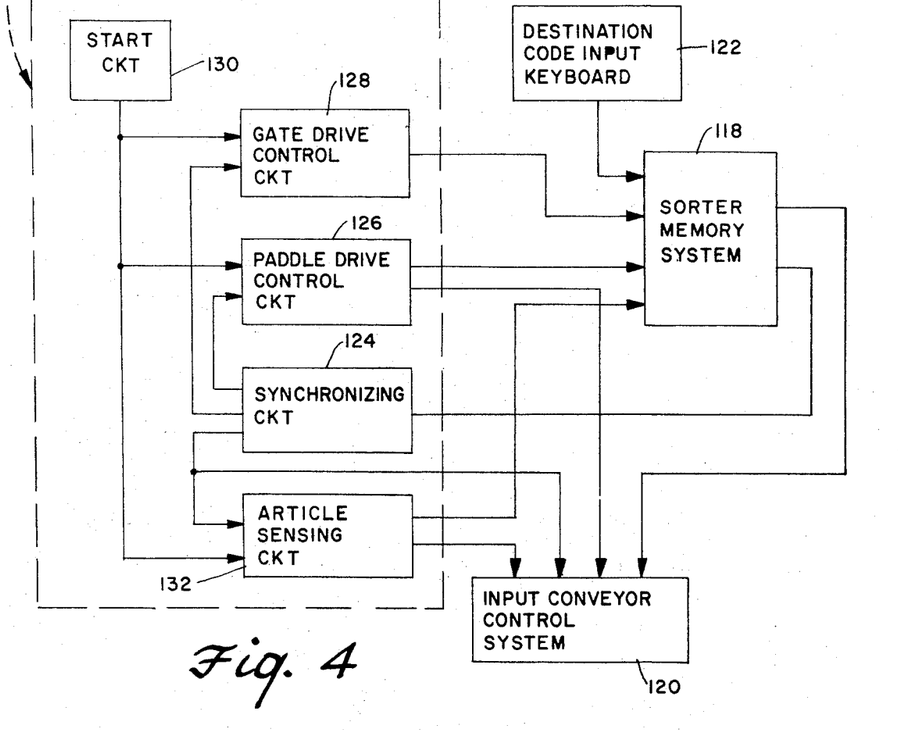
FIG. 4 is a block diagram illustrating the control systems associated with the apparatus of the present invention.

The control system for the article transfer apparatus is diagrammatically shown in FIG. 4 and denoted by reference numeral 116. The control system 116 is associated with the sorter memory system 118 aforementioned through which automated operation of the sorter conveyor is achieved. Operation of the input conveyor may also be controlled or automated by a system 120 interconnected with the sorter memory system and with the transfer control system 116 as diagrammatically shown in FIG. 4. The sorter memory system and input conveyor control system 120 form no part of the present invention, but are briefly described because of their association with the article transfer apparatus and its associated control system 116. The sorter memory system and conveyor control system are of a type that enable an operator to preselect the destination to which articles are delivered by the sorter conveyor. The coded destination of each article which is placed on the input conveyor may be read by the operator at any convenient location prior to arrival of the article at the receiving zone of the sorter conveyor. The code destination information is entered into the sorter memory by the operator through a keyboard 122. Only then will the article transfer apparatus be conditioned for operation by an output from the memory system applied to a synchronizing circuit section 124 of the control system 116. The synchronizing circuit section 124 is interconnected with the paddle drive control circuit 126 and the gate drive control circuit 128 through which synchronized operation of the paddle and gate rotor assemblies 28 and 30 are effected. Power for rendering the apparatus operative is supplied to the control circuits 126 and 128 through a start circuit 130 which also energizes the article sensing circuits 132 associated with the sensors 90, 92, 94 and 96 aforementioned. The synchronizing circuit 124 is also interconnected with the article sensing circuits and the input conveyor control systems to which outputs are also supplied from the article sensing circuits. Input data to the sorter memory system is derived from the limit switches 104 and 110 aforementioned through the drive control circuits 126 and 128 and from the article sensing circuits.

Figure 5:
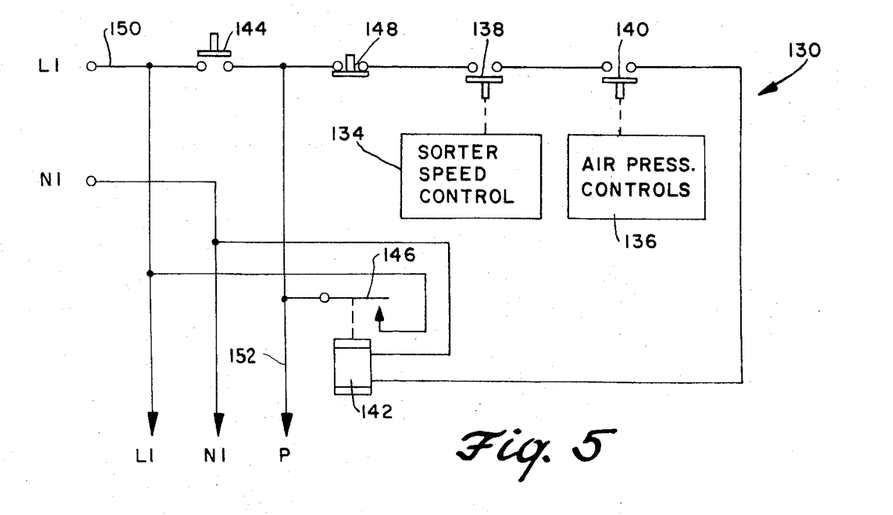
FIG. 5 is an electrical circuit diagram of the start circuit associated with the transfer control system illustrated in FIG. 4.
Figure 6A:
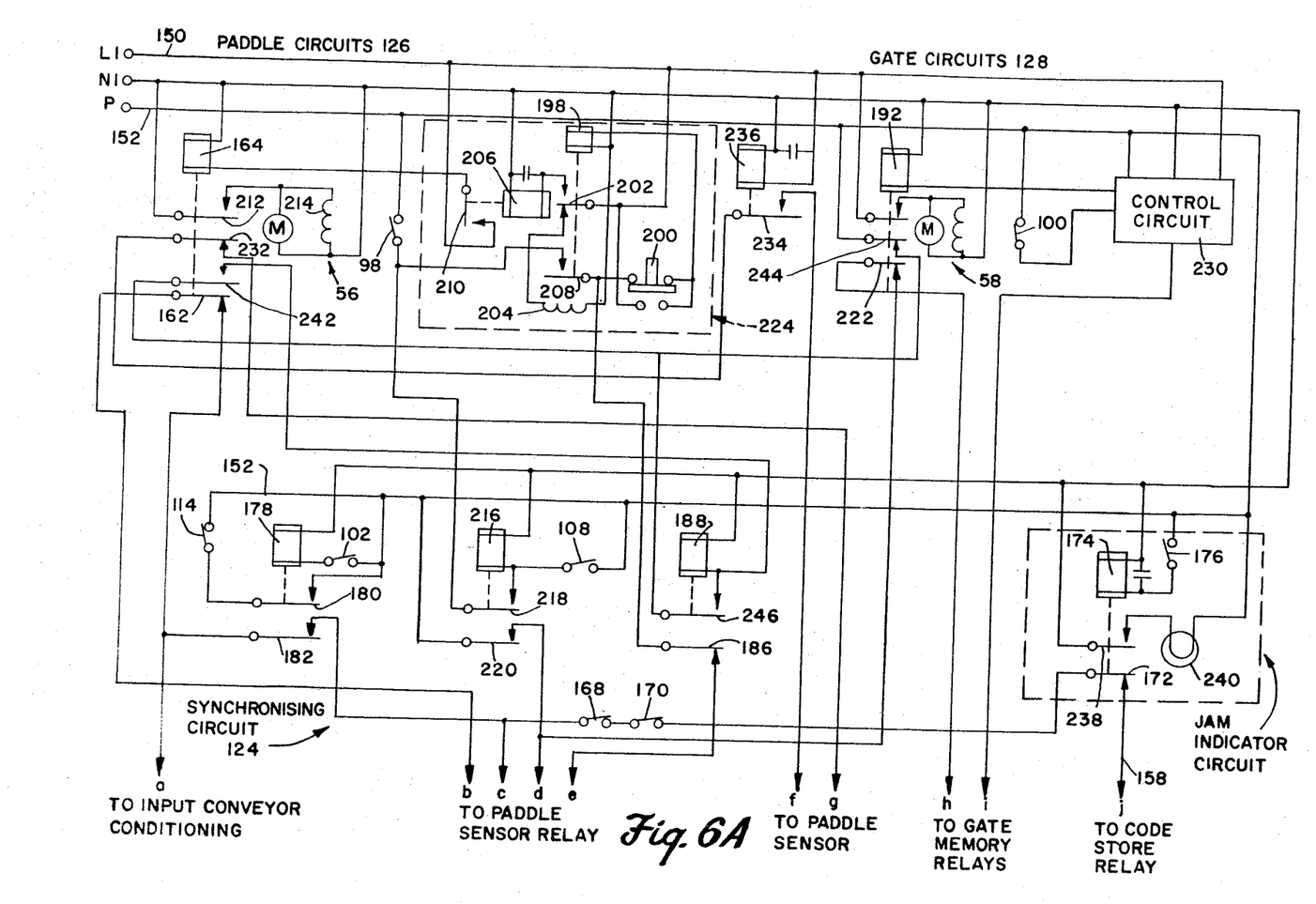
FIGS. 6A and 6B are electrical circuit diagrams of the remainder of the transfer control system.
Figure 6B:
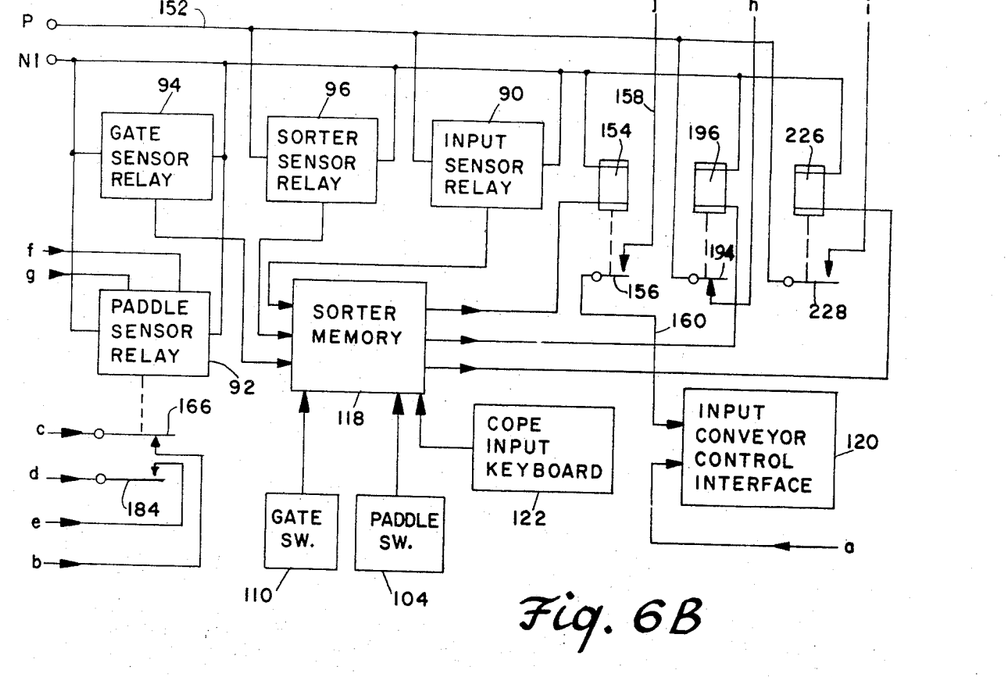

FIGS. 5, 6A and 6B illustrate the electrical wiring associated with the transfer control system 116 with which the various limit switches and photo-sensing relays are associated. The start circuit 130 as shown in FIG. 5 is also associated with a speed sensing control component 134 through which operation of the transfer apparatus is prevented until the sorter conveyor has attained a proper operational speed. Air pressure for engagement of the brake devices 72–78 diagrammed in FIG. 3 must also be available before the transfer apparatus is operated. Accordingly, air pressure sensing control component 136 is provided for this purpose as shown in FIG. 5 to prevent operation of the transfer apparatus until sufficient operating pressure is available.

STARTING OPERATION

When the sorter conveyor is running at operating speed, the speed control 134 closes switch 138 in the start circuit 130. The speed switch 138 is connected in series with an air pressure switch 140 that is closed by pressure responsive controls 136 when the air supply is adequate for the solenoid valve controlled, air pressure brake operators 72–78. Thus, upon closing of switches 138 and 140, the start circuit is conditioned for energizing the start relay coil 142 upon momentary closing of the start switch 144. The normally open relay switch 146 is thereby closed by-passing the start switch so as to maintain relay coil 142 energized until the start circuit is opened by actuation of the normally closed stop switch 148 in series with switches 138 and 140. Closing of relay switch 146 also connects power line 150 to the voltage supply line 152 in order to maintain the system in operation including the energization of the photosensor relay assemblies 90, 92, 94 and 96 adjacent the delivery end of the input conveyor, at the paddle rotor, at the gate rotor and at the receiving zone on the sorter conveyor.

TRANSFER FROM INPUT CONVEYOR TO PADDLE WHEEL

The destination code number on the article being conveyed by the input conveyor toward the paddle rotor 28, is read by the operator and entered into the memory 118 by means of the keyboard 122. When the coded input is stored, the memory produces an output to energize the code storage relay coil 154 (FIG. 6B) closing its normally open relay switch 156. This enables the input conveyor by interconnecting lines 158 and 160 connected to the control interface 120 for the input conveyor control system. Before the input conveyor can operate, normally closed relay switch 162 associated with the motor start relay coil 164 for the paddle rotor 28 (FIG. 6A) must be closed reflecting a de-energized condition of the paddle drive control circuit 26. The paddle sensor relay 92 must not detect any article in the paddle wheel so that normally closed relay switch 166 will be closed; the right and left overhang switches 168 and 170 must be closed detecting no overhang of carpet; and the normally closed relay switch 172 associated with the time delay jam detection relay coil 174, must be closed reflecting an open condition of the jam detection switch 176 in the energizing circuit of the relay coil 174. The switch 176 is held open by a cam lobe 112 in the indexed positions of the gate rotor as shown in FIG. 2. Relay switches 172, 156, 166 and 162 are connected in series with the overhang switches 168 and 170 to the interface to initiate operation of the input conveyor when all of said switches are closed reflecting proper operation conditions for initial transfer of a carpet roll from the input conveyor to the paddle wheel.

To increase the flow rate of articles through the transfer apparatus, means are provided to obtain an overlap in motion of the input conveyor and the rotor assemblies once operation has begun and the paddle rotor has completed a portion of its operational cycle. The paddle rotor then actuates the normally cam operated switch 102 in the synchronizing circuit 124 to energize relay coil 178. A normally open relay holding switch 180 connected in series with normally closed reset limit switch 114 adjacent the delivery end of the input conveyor, is closed to maintain relay coil 178 energized. A normally open relay switch 182 is also closed to by-pass the relay switches 162 and 166 associated with the motor start relay 164 of the paddle drive control circuit and the paddle sensor relay 92. Thus, operation of the input conveyor will continue even though the paddle drive control circuit and the paddle sensor relay are activated as long as the other conditions remain satisfied. The operational overlap means is deactivated when the reset limit switch 114 is actuated to deenergize the relay coil 178.

PADDLE ROTOR OPERATION

When the roll is received in the paddle rotor, it is detected by the sensor 92 to close its normally open relay switch 184. The normally closed relay switch 186 associated with the deenergized relay coil 188, the actuated sensor relay switch 184, the normally closed relay switch 222 associated with the gate motor start relay coil 192 and the normally closed relay switch 194 associated with the gate memory relay coil 196 are interconnected in series to complete an energizing circuit for the paddle control relay coil 198 through the normally closed contacts of the manual override switch 200. Relay switch 202 is thereby actuated to remove power from the brake solenoid 204 to release the paddle rotor shaft and transfer power to the time delay relay coil 206. The control relay coil 198 is maintained energized upon closing of its normally open relay holding switch 208 connected in series with the normally closed, 90° drive limit switch 98. After a short delay, the time delay relay coil closes its normally open relay switch 210 to energize the paddle motor start relay coil 164. When energized, the start relay closes its normally open relay switch 212 to operate the paddle motor 56 energizing its brake release solenoid 214. After 90° rotation of the paddle rotor 28, the limit switch 98 is actuated to open the relay holding circuit for the control relay coil 198 causing it to deenergize and stop the paddle rotor by deenergizing the brake solenoid 204 and the motor 56 through relay coils 206 and 164.

Operation of the paddle rotor is resumed after the gate rotor has completed a portion of its operational cycle with the closing of its cam operated switch 108 to complete an energizing circuit for the relay coil 216 in the synchronizing circuit 124. The normally open relay holding switch 218 is thereby closed to maintain relay coil 216 energized through the normally closed cam operated switch 108 actuated by the gate rotor. Normally open relay switch 220 also closes to by-pass the normally closed relay switch 222 of the gate motor start relay 192 and the gate memory relay switch 194 so as to reactivate the paddle control circuit 224 despite opening of relay switch 222 upon activation of the gate drive control circuit 128 as long as other conditions are satisfied including detection of a roll in the paddle wheel by the paddle sensor relay 92 to close its relay switch 184. Overlapping motion of the two rotor assemblies is thereby obtained to increase the flow rate of articles through the transfer assembly. When the paddle rotor rotates 90°, its drive limit switch 98 is opened to deenergize the relay coil 198 to reset the paddle circuit 126.

GATE ROTOR OPERATION

When the roll reaches the gate wheel, the gate wheel memory relay coil 226 is energized by an output from the memory to close its normally open relay switch 228 and thereby energize the gate control circuit 230 which is similar to the paddle control circuit 224. The gate control circuit 230 is thereby activated through its time delay relay coil and motor start relay coil 192 as in the case of the paddle control circuit 224 previously described. The gate control circuit is also reset by opening of the gate drive limit switch 100 after the gate wheel has rotated 180°. The foregoing operation of the gate wheel is enabled by an output from the memory to the relay coil 226 as aforementioned only if various conditions at the receiving zone on the sorter conveyor are satisfied including passing of five (5) sorter trays following discharge of the last roll from the gate rotor, and removal of the last roll from the receiving zone.

The memory receives its input data from the gate, sorter and input sensor relays 94, 96 and 90 and from the gate and paddle actuated limit switches 110 and 104. The paddle sensor relay which latches when activated is unlatched or reset whenever the paddle rotor is rotating by opening of the normally closed relay switch 232 of the motor start relay 164, which is connected in series with the normally open relay switch 234 associated with time delay relay coil 236 that delays enabling of the sensor relay 92 for a short interval after power is applied to voltage supply line 152 upon starting of the system.

If the gate rotor does not reach an indexed position within the time delay of relay coil 174, the limit switch 176 remains closed to energize the time delay jam relay coil 174. This will close its normally open relay switch 238 to turn on a jam indicator lamp 240 and open its normally closed relay switch 172 to prevent transfer of a roll to the paddle rotor from the input conveyor until the jam condition is corrected.

The inhibit relay coil 188 is energized through relay switches 242 and 244 upon energization of the motor start relay coil 164 to open relay switch 186 and prevent reactivation of the paddle control circuit 224 until power is removed from its relay holding switch 246 upon opening of relay switch 244. Relay switch is opened when the gate motor start relay coil 192 is energized. Thus, rotation of the paddle rotor is inhibited in order to obtain alternate although overlapping rotation of the rotor assemblies.

The control system 116 hereinbefore described will accomodate variations in the input rate of articles discharged from the input conveyor 14 into the transfer assembly in order to deliver the articles at a maximum rate to the sorter conveyor 16 and in synchronism therewith while providing the desired pauses in movement of the articles to permit encoding. By virtue of the overlapping motion action aforementioned, articles are delivered to the sorter conveyor without any gaps in the delivery sequence despite the input rate variations as diagrammatically depicted in FIG. 7. By way of example, FIG. 7 depicts along a time scale 250, by means of arrows 252, discharge of articles at a rate of one article every 5 seconds with a variation of ± 2 seconds. Thus, the articles are shown discharged, in a tyical sequence, from the input conveyor at 7, 3 and 6 second intervals. After a minimum ½ second delay following discharge of each article, a 90° rotational cycle for the paddle rotor 28 ensues of 2 seconds duration as denoted by 254. Each cycle 254 of the paddle rotor is followed by a 180° cycle 256 of the gate rotor 30 after a minimum ½ second delay. The articles are delivered to the sorter conveyor during each gate rotor cycle 256, as denoted by arrows 258 in FIG. 7. A minimum 4½ second interval between the arrows 258 represents the maximum delivery rate at which the articles are synchronously received by the sorter conveyor. Thus maximum delivery rate is maintained as far as possible despite input rate variations by intermittent overlaps 260 between rotor movements as shown in FIG. 7. The duration of the paddle rotor cycle 254, the delay before each cycle 254 begins following discharge from the input conveyor and the minimum delay following discharge of the next article or beginning of a gate rotor cycle 256 will dictate the upper limit of input rate variation.

What is claimed is:

1. The combination comprising
    an input conveyor,
    a sorter conveyor having means along the path thereof for discharging articles from the conveyor to predetermined zones along the path of the conveyor,
    and means for transferring articles from the input conveyor to the sorter conveyor comprising
    first rotor means having four vanes defining article receiving pockets,
    means for rotatably mounting said first rotor means between said input conveyor and said sorter conveyor about a generally horizontal axis parallel to a portion of the path of the sorter conveyor,
    drive means operatively connected to said rotor means for intermittently rotating said first rotor means in one direction for bringing a pocket successively from a first to a second position, a third position and then the first position,
    said first position being such that a vane of each pocket forms an inclined entrance ramp,
    said second position being such that the adjacent vane of the same pocket defines an exit ramp,
    said drive means driving said rotor means at a rate such that said vane forming an entrance ramp lifts an article being transferred from said first position to said second position and augments the gravitational movement of the article to said second position such that the article moves off of the vane that is acting as an exit ramp,
    an inclined receiving ramp onto which the article is delivered at the second position,
    gate motor means,
    means for rotatably mounting said gate rotor means between said receiving ramp and said sorter conveyor about a generally horizontal axis parallel to a portion of said sorter conveyor and parallel to the axis of said rotor means,
    drive means operatively connected to said gate rotor means for intermittently rotating said gate rotor means 180°,
    said gate rotor means having two diametrically opposed vanes which successively cooperate with said receiving ramp to define a receiving pocket for an article transferred from said first rotor means.

2. The combination set forth in claim 1 including synchronizing means for stopping said input conveyor when the pocket is not in the first position, is not empty for receiving an article from said input conveyor, for conditioning said first rotor means for rotation only when said pocket defined by said gate rotor means and said receiving ramp is empty for receiving an article, and for conditioning said gate rotor means for rotation only when a predetermined portion of the sorter conveyor is empty for receiving an article.

3. The combination set forth in claim 2 including operational control means connected to the synchronizing means for producing overlapping motion of the rotor means and one of the conveyors to increase the flow rate of articles between said conveyors.

4. The combination set forth in claim 1 wherein said drive means for said gate rotor means rotates said gate rotor means in a direction opposite to that of said first rotor means.

5. The combination set forth in claim 1 including brake means on each said rotor means cooperating with said drive means for holding said rotor means in the aforementioned predetermined indexed positions.

6. The combination comprising
    an input conveyor,
    a sorter conveyor having means along the path thereof for discharging articles from the conveyor to predetermined zones along the path of the conveyor,
    and means for transferring articles from the input conveyor to the sorter conveyor comprising
    first rotor means having a plurality of vanes defining article receiving pockets,
    means for rotatably mounting said first rotor means between said input conveyor and said sorter conveyor about a generally horizontal axis parallel to a portion of the path of the sorter conveyor,
    drive means operatively connected to said rotor means for intermittently rotating said first rotor means between successive indexed positions,
    said successive indexed positions including a first position and a successive second position,
    said first position being such that a vane of one pocket forms an inclined entrance ramp,
    said second position being such that the adjacent vane of the same pocket defines an exit ramp,
    said drive means driving said rotor means at a rate such that said vane forming an entrance ramp lifts an article being transferred from said first position to said second position and augments the gravitational movement of the article to said second position such that the article moves off of the vane that is acting as an exit ramp,
    an inclined receiving ramp onto which the article is delivered at the second position,
    gate rotor means,
    means for rotatably mounting said gate rotor means between said receiving ramp and said sorter conveyor about a generally horizontal axis parallel to a portion of said sorter conveyor and parallel to the axis of said rotor means,
    drive means operatively connected to said gate rotor means for intermittently rotating said gate rotor means,
    said gate rotor means having vanes which successively cooperate with said receiving ramp to define a receiving pocket for an article transferred from said first rotor means.

7. The combination set forth in claim 6 including synchronizing means for stopping the input conveyor when a pocket of the first rotor means is not in the first position and is not empty for receiving an article from said input conveyor, for conditioning said first rotor means for rotation only when said pocket defined by said gate rotor means and said receiving ramp is empty for receiving an article, and for conditioning said gate rotor means for rotation only when a predetermined portion of the sorter conveyor is empty for receiving an article.

8. The combination set forth in claim 7 including operational control means connected to the synchronizing means for producing overlapping motion of the rotor means and one of the conveyors to increase the flow rate of articles between said conveyors.

9. The combination set forth in claim 6 wherein said drive means for said gate rotor means rotates said gate rotor means in a direction opposite to that of said first rotor means.

10. The combination set forth in claim 6 including brake means on each said rotor means cooperating with said drive means for holding said rotor means in the aforementioned predetermined indexed positions.

* * * * *